United States Patent [19]

Schacht et al.

[11] 4,359,645

[45] Nov. 16, 1982

[54] ELECTRICAL CONVERSION APPARATUS FOR INDIVIDUAL TENANT METERING

[76] Inventors: Ezra L. Schacht, P.O. Box 8367, Houston, Tex. 77004; Barry E. Spain, 405 Westmoreland, Houston, Tex. 77006

[21] Appl. No.: 889,019

[22] Filed: Mar. 22, 1978

[51] Int. Cl.³ .............................................. H02B 1/04
[52] U.S. Cl. .................................. 307/113; 361/358; 361/365
[58] Field of Search ............... 361/346, 347, 353, 355, 361/356, 358, 361, 365–371; 307/112, 113, 147; 29/622, 624

[56] References Cited

U.S. PATENT DOCUMENTS

| | | | |
|---|---|---|---|
| 2,403,132 | 7/1946 | Sparkes | 361/365 |
| 3,753,047 | 8/1973 | Shallbetter | 361/364 |
| 4,041,358 | 8/1977 | Donahue | 361/365 |

Primary Examiner—Gerald P. Tolin

[57] ABSTRACT

Escalating energy costs are forcing many landlords to seek methods of eliminating the single watthourmeter for the entire apartment complex and the like, and replacing it with individual meters for each tenant. A problem encountered is the aggregation of many circuit breakers within one enclosure, circuits to several apartments originating therein. By use of special insulating barriers, individual circuit-breaker assemblies accessible to each apartment dweller may be closely grouped within old existing electrical enclosures, and a sealable gutter within the same enclosure for use by the metering utility is provided. Installation of separate circuit breaker enclosures for each apartment and use of the existing circuit breaker enclosure only as a splicing and junction box is avoided, resulting in a more compact and less expensive installation. An improved meter mounting assembly is combined with the apparatus.

1 Claim, 13 Drawing Figures

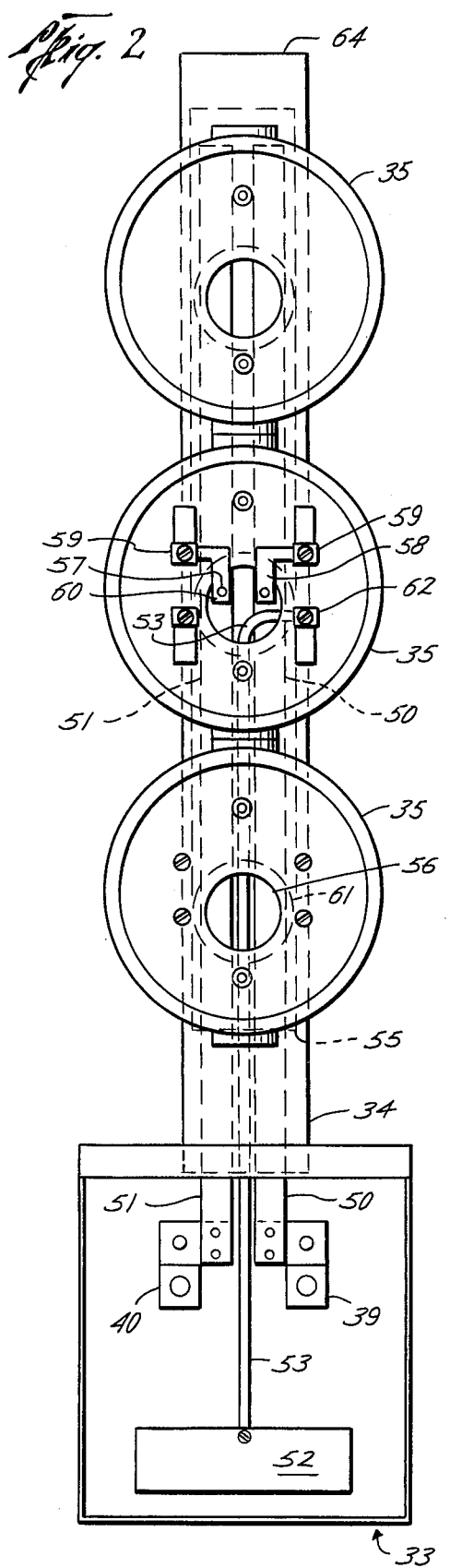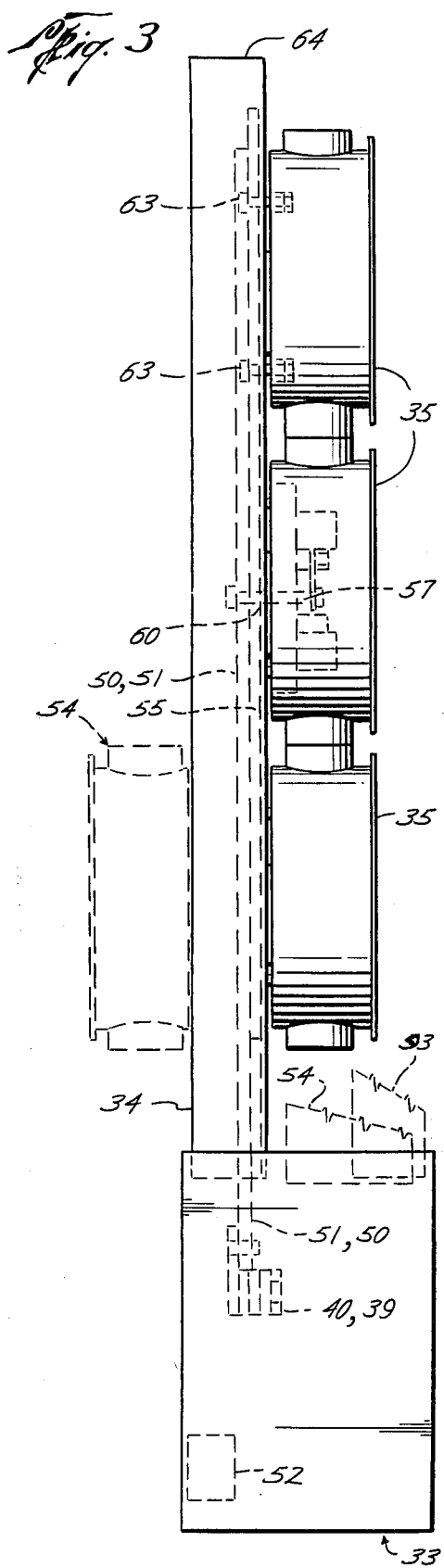

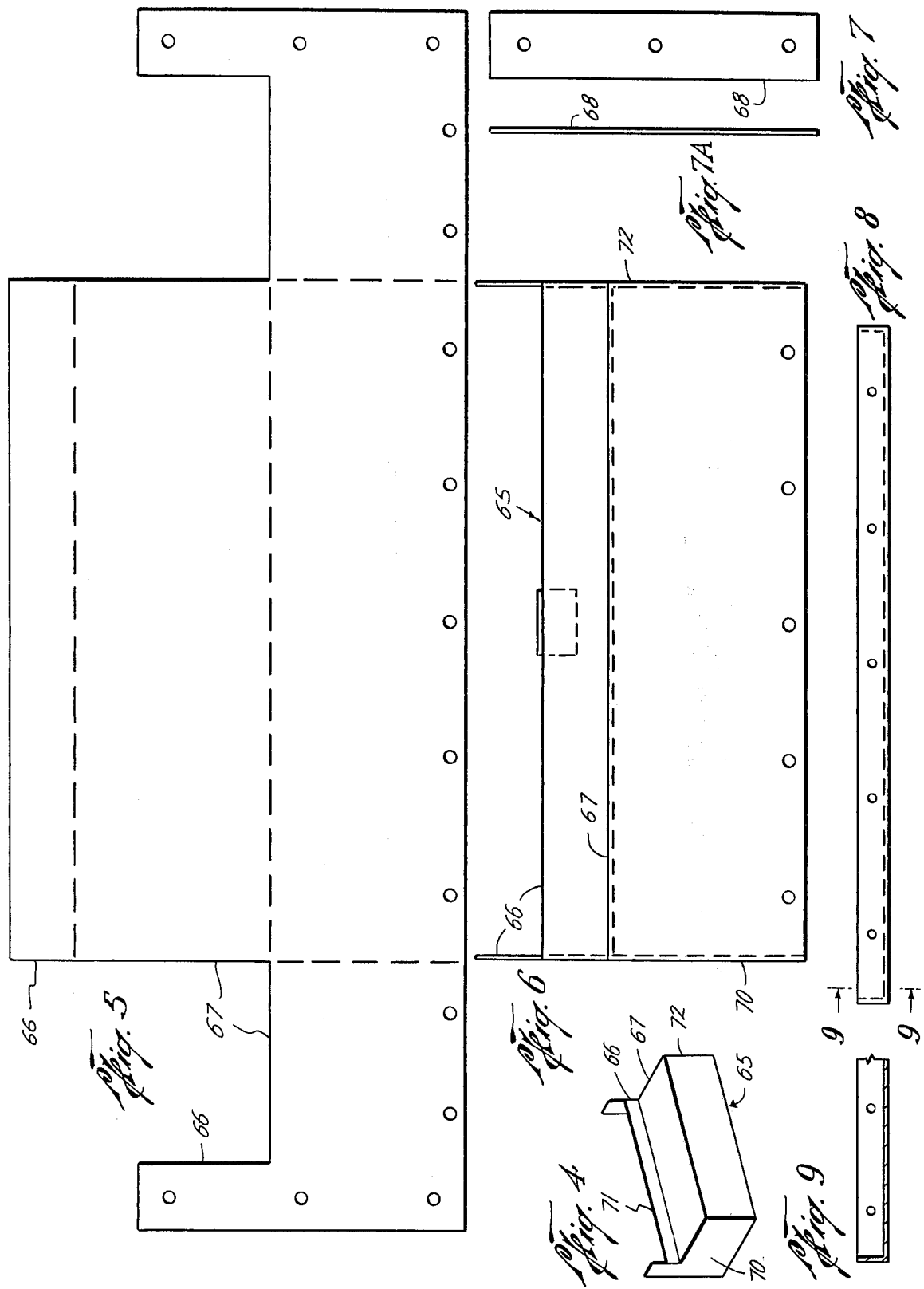

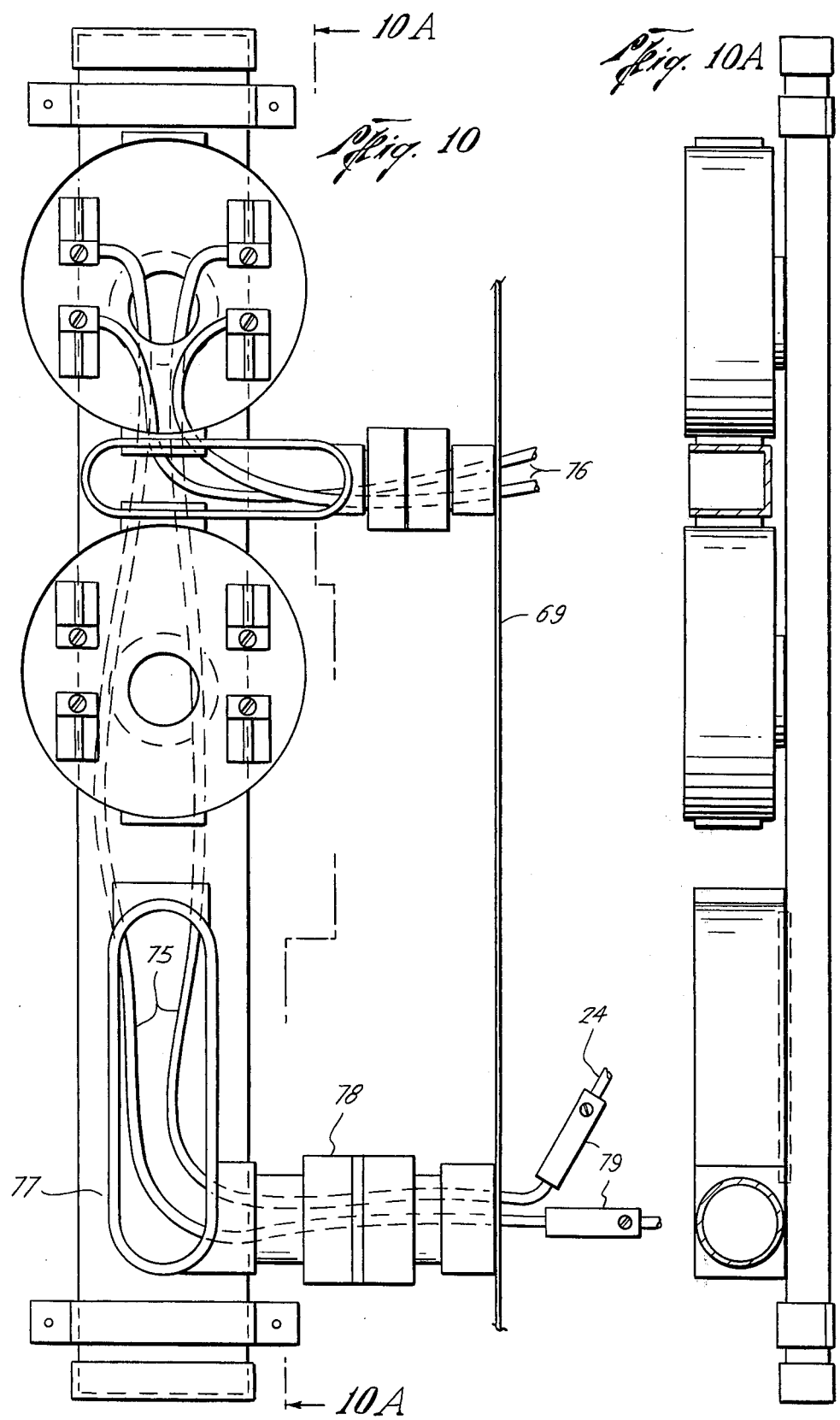

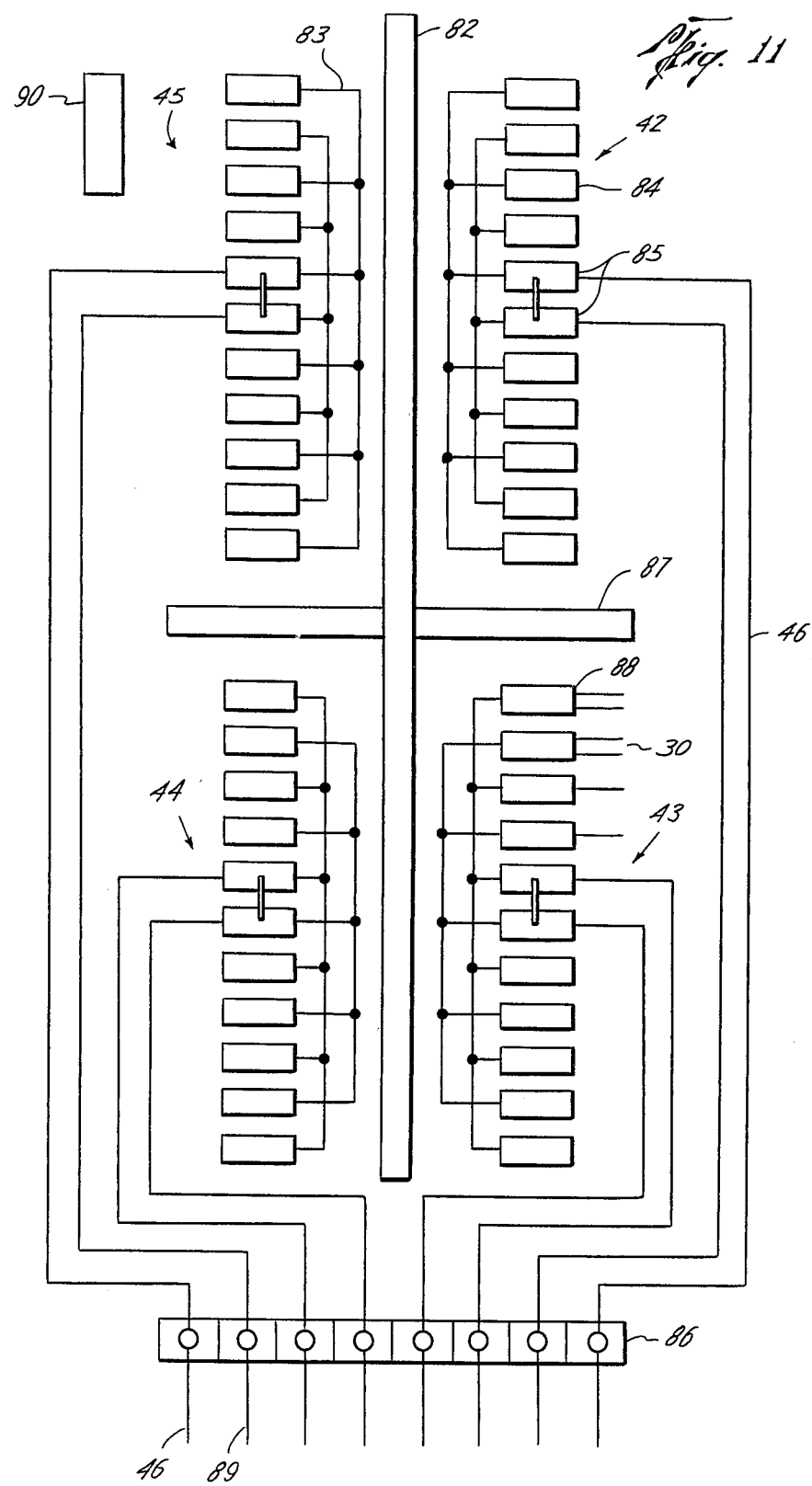

ELECTRICAL CONVERSION APPARATUS FOR INDIVIDUAL TENANT METERING

BACKGROUND OF THE INVENTION

Present methods of conversion from single meter installations to individual tenant metering and the like, generally provide a new service conduit from the utility supply network to a new bank of meter sockets, mounted on the exterior wall, say four on the average, each serving a new raintight multibreaker panel for each apartment. Conduits are then run back to the old multibreaker panel, which is used as a splice box only, where the old branch circuit wires are spliced to the new conductors, the old breakers panel interiors having been removed and discarded. The old combined multi-breaker panel may have been neatly mounted on the wall surface or recessed in the brick veneer in a space of approximately 14 inches wide by thirty inches high.

The revised installation involves rerouted service conduits, a wall space four feet in width by one foot high for raintight meter sockets alone, and an even larger area for the new multibreaker panels, and a plethora of conduits run on the surface from the new boxes to the old gutted panel, now reduced to a splice box. To compound the problem, there is usually not enough room for this massive amount of new equipment, since the old panel may have been mounted between windows, or at the corner of a building, where a vertical space of approximately one foot is all that may be available for conversion equipment.

The revised system thus is unsightly, takes up a great deal of wall surface, may have to be remotely located from the existing panel because of the lack of adjacent space, and is expensive for the foregoing reasons.

It would, therefore, be highly desirable to provide a novel apparatus which remedies these and related problems which remain in the prior art.

OBJECTS AND SUMMARY OF PREFERRED EMBODIMENTS OF THE INVENTION

Accordingly, it is a primary object of the present invention to provide a novel metering conversion apparatus which substantially eliminates problems in the prior art of the type previously noted.

It is a more particular object of the present invention to provide a metering conversion apparatus which reutilizes the present panelboard by a novel arrangement of breakers for the individual apartments or the like.

It is another object of the present invention to provide a compact apparatus for the mounting of individual meters, vertically if preferred, in a very narrow space, with fully raintight provisions.

It is a further object to provide more compact power bussing to the meter bank than is conventionally employed.

It is a further object of the present invention to provide coupling enclosures from the present multibreaker enclosure to the metering assembly.

Other objects, advantages, and features of the present invention will become readily apparent to those skilled in the art upon consideration of the following detailed description and with reference to the following drawings, wherein like elements have been identified with like numerals, in which:

BRIEF DESCRIPTION OF THE DRAWINGS

FIGS. 2 and 3 show side and front views of the metering assembly;

FIGS. 4 through 9 show assembled and unassembled views of a special embodiment of the junction box for the meter loop;

FIGS. 10 and 10A is a front and sectional view of another embodiment of the meter loop assembly; and FIG. 11 is a schematic wiring diagram of the revised panelboard circuiting and representation of the essential physical elements.

Figure 1:
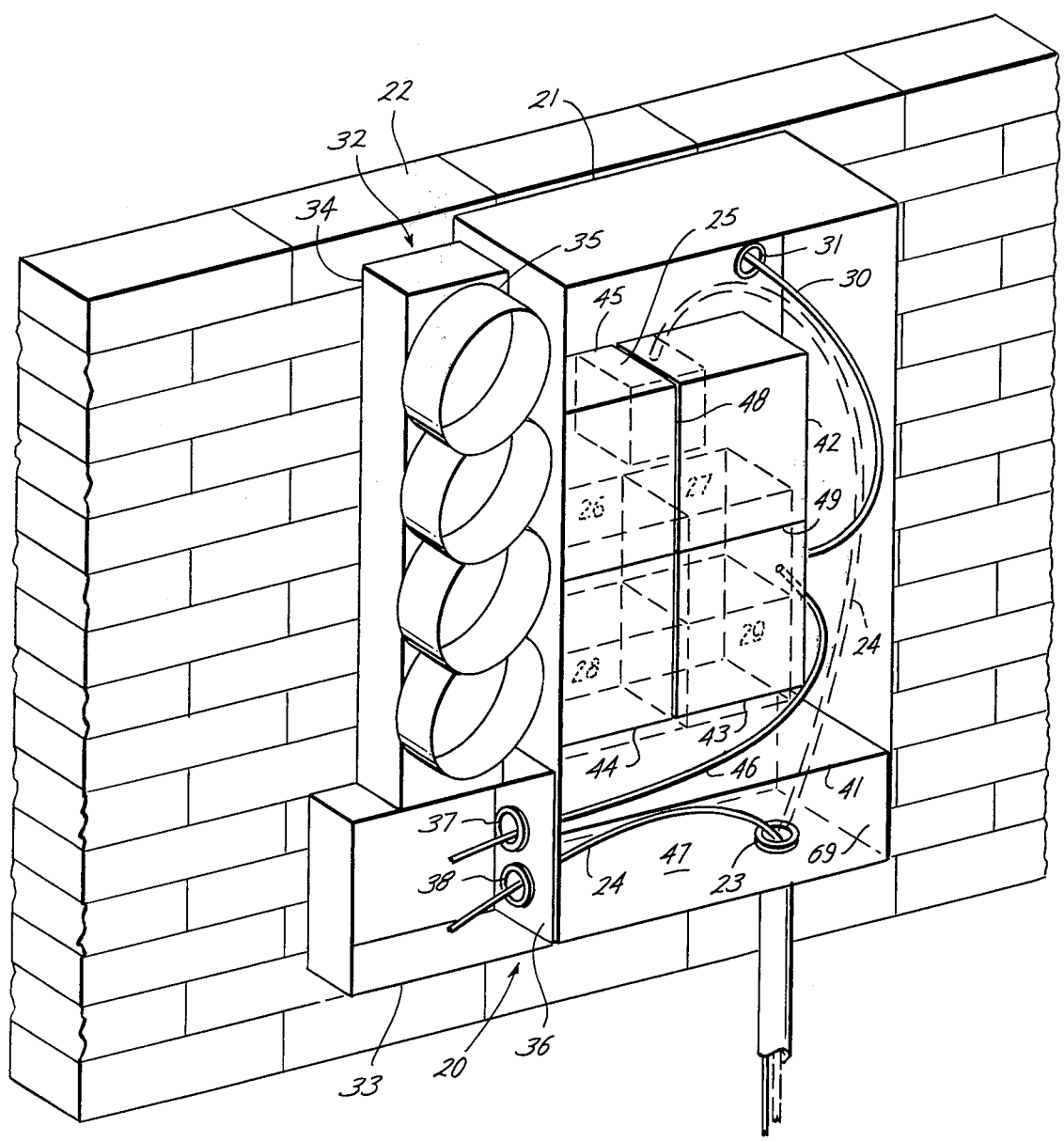
FIG. 1 shows a pictorial view of the combination of existing panelboard enclosure, junction box, and metering assembly.

A preferred embodiment of the present invention comprises a vertical arrangement of meter sockets, say four in number mounted on a vertical section of rectangular tubing, welded at its lower end to a suitable junction enclosure, easily couplable to the existing panel enclosure, whether surface mounted or recessed.

Within the junction enclosure are connection lugs for receipt of the heavy service conductors, which are pulled through the present panelboard enclosure, rather than terminating therein as originally installed. Bussing within the meter assembly feeds the meters and provides supply conductors to the individual new multibreaker assemblies, which are grouped in novel fashion within the old enclosure. Main breakers for each tenant may be installed with the branch-circuit breakers in the original panelboard enclosure, or may alternately be installed within the new junction enclosure. The intent is to provide as much space as possible in the existing panelboard for the novel arrangement of individually metered breaker assemblies.

DESCRIPTION OF PREFERRED EMBODIMENTS OF THE PRESENT INVENTION

With reference now to FIG. 1 there may be seen an apparatus 20 of the present invention. In this embodiment, the existing panelboard enclosure 21 is mounted on the surface of brick wall 22, although the invention works equally well with recessed equipment. Original equipment within the enclosure 21, shown in dashed lines include bushed end 23 of feeder conduit, feeder conductors (shown as single cable) 24, terminating in main circuit breaker 25. Bussing (not shown) from main breaker 25 feeds grouped circuit breakers 26, 27, 28, and 29, each group of which serves the branch circuits of a single apartment. One such branch circuit wiring 30 is showing passing out of the enclosure 21 through conduit 31, and will be reused in this invention.

Part of this invention, metering assembly, or meter loop 32, is mounted adjacent to the existing enclosure 21 on the wall 22. Included in loop 32 are junction box 33, hollow capped member 34, and meter sockets 35. Connections are made through walls 36 of junction box 33 and enclosure 21, coupled together by conduit nipples with bushed ends 37 and 38, although a single nipple may be used in another embodiment. Main breaker 25, and grouped branch circuit breakers 26, 27, 28 and 29 may now be removed from existing panelboard enclosure 21, leaving branch circuit wiring, of which circuit 30 is typical, in place. Feeder conductors 24 may now be relocated from the (dashed line) original position to new position 24, and threaded through nipple and bushing 38 into box 33, where connections may be made to line terminals 39 and 40 shown on FIG. 3, in junction box 33. A barrier 41 may be installed if desired to isolate feeder conductors 24 from remaining portion of enclosure 21. Neutral conductor feeder 24 (not shown) may again terminate at existing neutral lug in enclosure 21.

New multiple bussing may now be installed in enclosure 21, specifically designed as shown in FIG. 11 to serve isolated groups of breakers 42, 43, 44 & 45, which replace groups 26 through 29, and have load terminals approximately at the same points to facilitate reconnections of branch circuit wiring. Feeder conductors 46 (as group) from junction box 33 supply groups of breakers 42 through 45, through main breakers 85 (see FIG. 11) if desired or required, and extend from load terminals of meter sockets 35 as required. Compartment 47 containing feeder (now service) conductors 24 may be sealed by the utility as may junction box 33, to prevent tampering by unauthorized persons. Barriers 48 and 49 (also shown as 82 and 87 in FIG. 11) preferably of insulating material, serve to electrically isolate the adjacent multiple bussing for circuit breaker groups 42 through 45, and may additionally serve as physical barriers to prevent tampering with circuits, extending possibly out to inside cover of the reconstructed panelboard.

With reference now to FIGS. 2 and 3, there may be seen detailed drawings of sections of the meter loop assembly 32, for a three-unit apartment complex, or the like.

FIGS. 2 and 3 illustrate primarily details of junction box 33. FIG. 3 shows an open front view of a raintight box, showing lugs 39 and 40, to which are connected feeder conductors 24, and which in turn are bolted to meter supply busbars 50 and 51. Shown also is connection block 52, to which are connected load leads from meter sockets, of which one, 53, is shown, and to which leads 46 to breakers are also connected. Hollow capped member 34 is shown welded into top of box 33. Note also that tubular hollow member 34 may be repositioned and welded as at 93 in FIG. 3, where panel 21 is recessed into brick wall and member 34 must be brought out from front top of box 33 in this case partly recessed in wall. Note also that member 34 may be rotated ninety degrees as shown at 54, so that two banks of meter sockets may be mounted on member 34, as shown at 54 in FIG. 3. In this case of course, meter faces will be perpendicular to wall surface, but where space is at a premium, this embodiment may be useful. With further reference to FIG. 3, there may be seen insulation barrier 55 which insulates busbars 50 and 51 from metal hollow member 34, although insulated conductors may be substituted for busbars 50 and 51 without departing from the spirit of this invention.

Axially aligned holes may be made through back of meter socket 35, face of tubular member 34 and insulation sheet 55, permitting copper studs 57 to be bolted to bus 50 and 51, and by means of links 58 to connect to meter line terminals 59. Insulating sleeve 60 of phenolic or similar material may be used to provide insulation between copper stud 57 and edges of hole 56 in back of meter socket 35. Gasket 61 may be used to seal openings 56 against entry of rain water, when compressed between surface of member 34 and back of socket 35. Conductor 53 is connected to meter load terminal 62, and passes between busses 50 and 51, then traversing length of member 34 to its point of connection in box 33, to connection block 52.

FIGS. 2 and 3 show the method of clamping meter socket 35 to hollow member 34 by two bolts 63, and welded end 64 of member 34.

Although the foregoing description illustrates a generic approach to the problem, applicable to various enclosures, it is envisaged that specific manufacturers may wish to provide a kit for such conversions of installed panelboards of their own manufacture. For such specific use, an enclosure of the type shown in FIG. 4 may be used as an extension box for an electrical panelboard which may be recessed in a wall. It may be fabricated from a single sheet metal piece as shown in FIG. 5. Edges 66 and 67 are welded together, resulting in a hood-like piece, slightly shorter in length than the inside width of the box 21, allowing for the gasket thickness 68 between inside wall of box 69 and surface 70 of hood-like piece. When gasket is compressed, by screws through 70 into box wall 69, a raintight seal results. Vertical upstanding rain deflecting lip 71 also serves as a stop for the lid (not shown) which is hinged at the top. It will be necessary to shorten the length of the lid by slightly more than the height of the extension 72. Hood 64 can also be made of two telescoping halves, to compensate for slight differences in inside box width, again using a gasket to assure raintightness.

FIGS. 10 and 10A show a simplifed meter loop arrangement for use with the hood 65 of FIG. 4. Both line conductors 75 and load conductors 76 may be in the form of insulated wire, such as #4AWG, for the average apartment loads to be encountered. And the large junction box 33 may be replaced with a Condulet type fitting 77, and Ericson type coupling 78 and a hub-like connection into the hood 65 or into the panelboard enclosure itself. For surface installations, conductors 76 may likewise be brought into the side of the panel 69 in similar fashion. In-line connectors 79, small enough in diameter to slip through coupling 78 may be used for connecting meter supply leads 75 to feeder conductors 24.

FIG. 11 shows diagramatically and physically the nature of the revised panelboard required. Conventional multibreaker panels for residential and commercial use have a single vertical bus located approximately in the position of vertical insulating barrier 82. Circuit breakers similar to 84 are alternately connected to extensions of busses 46 and 89 and the like but there is no simple provision for separating groups of breakers except by "split-bussing," that is, dividing the single bus into vertical sections. Because it is conventional, in the single meter prior wiring method to group the individual apartment circuits as shown at 42 through 45, the method of bussing shown in FIG. 11 is a novel solution for a rapid simple reconnectable changeout, and circuit 30, for example, continues to be connected to the same approximate point physically as previously. Typical wide breakers 84 or narrow breakers 88 may be used in this system, but barriers 82 and 87, if necessary, may be used to provide required spacing for the voltages encountered. An additional advantage of such partitions as 82 and 87 are a physical separation of circuits by apartment or the like, to avoid tampering by unauthorized persons. In general, it should be unnecessary to relocate neutral bus 90, but this is a simple matter if necessary.

SUMMARY OF ADVANTAGES AND SCOPE OF THE INVENTION

Thus, it may be seen that in the practice of the present invention certain distinct advantages may be realized. A neat compact conversion, economical of materials and labor, may be simply installed. Certainly this is significant in our continuing national effort to conserve energy, and the salutatory effect of individual metering on energy conservation cannot be ignored.

Certain concepts and habits, wasteful of energy, are challenged by this invention. For example, it has become customary for utilities, such as the Houston Lighting and Power Company, to think in terms of minimum 200-ampere electrical service per apartment, but with today's energy prices, a 100-ampere service per apartment is surely adequate, a fact confirmed by utility demand statistics.

This arbitrary 200-ampere minimum then requires very large meter housings, rather than using, for example, the compact 100-ampere meter socket of General Electric Company, No. 582X23, which is barely larger in diameter than the 100-ampere kilowatthourmeter, and designed to accept it.

Rather than massive bussing of large conductors, the present invention takes advantage of the diversity possible when true electrical load values are considered. And certainly, it is significant to indicate to manufacturers of electrical panelboards how a simple improvement in their equipment can contribute to energy conservation.

It, therefore, may be seen that the present invention is well adapted to attain substantially all of the objects and advantages hereinabove set forth together with other advantates which will become apparent from the description of the apparatus. For example, the invention is not limited to metering conversions alone, but the extension housing shown in FIGS. 4 through 9 may be generally useful in extending circuits from recessed panels.

This description, including the alternative embodiments, are intended as illustrative of the concept of the present invention, and it is intended that other embodiments be considered as falling within the spirit and scope of the present invention.

What is claimed is:

1. An improved method for metering separately the electrical energy supplied to individual occupants in apartment houses and the like, said energy having been previously metered through a single meter, and distributed to several apartments or the like through a single feeder and single panelboard enclosure having a main circuit breaker, branch circuit conductors, and breakers for all branch circuits to several apartments or the like, grouped in said panelboard, the improvement comprising:

removal of said main breaker and said branch circuit breakers from said panelboard enclosure;

installation adjacent to said panelboard enclosure of metering means having conductors for individual apartments or the like;

rerouting of said feeder through said panelboard enclosure along the inside perimeter of said enclosure, said feeder passing through an aperture in said enclosure into said metering means, said feeder being isolated from the remainder of said panelboard enclosure by a barrier forming a compartment;

installation of new branch circuit breakers in said panelboard enclosure;

installation of multiple bussing means in said panelboard enclosure, said bussing mens separately connectable to supply conductors for said individual apartments from said metering means and reconnectable to said new branch circuit breakers and said branch circuit conductors for said apartments; and said multiple bussing means, said new branch circuit breakers, said branch circuit conductors, and said conductors from said metering means, all grouped in a portion of said panelboard enclosure isolated by said barrier from said compartment through which said feeder conductor passes to said metering means.

* * * * *